United States Patent
Mitchell et al.

(10) Patent No.: US 7,388,518 B2
(45) Date of Patent: Jun. 17, 2008

(54) VEHICLE TRACKING SYSTEM

(75) Inventors: Peter Mitchell, Dublin (IE); Andrei Dolgopolov, Dublin (IE); Paul Walsh, Dublin (IE); John Goggin, Kildare (IE)

(73) Assignee: Fleetmatics Patents Limited, County Dublin (IE)

( * ) Notice: Subject to any disclaimer, the term of this patent is extended or adjusted under 35 U.S.C. 154(b) by 218 days.

(21) Appl. No.: 11/430,043

(22) Filed: May 9, 2006

(65) Prior Publication Data
US 2007/0266180 A1    Nov. 15, 2007

(51) Int. Cl.
G08G 1/123    (2006.01)
(52) U.S. Cl. .................. 340/988; 340/539.13; 455/428
(58) Field of Classification Search ................ 340/988, 340/425.5, 991, 993, 426.19, 439.13; 455/404.2, 455/428; 370/310, 351
See application file for complete search history.

(56) References Cited

U.S. PATENT DOCUMENTS

| | | | |
|---|---|---|---|
| 5,235,320 A * | 8/1993 | Romano ................. | 340/539.11 |
| 5,548,516 A * | 8/1996 | Gudat et al. ................. | 701/200 |
| 6,177,906 B1 | 1/2001 | Petrus ......................... | 342/378 |
| 6,751,452 B1 * | 6/2004 | Kupczyk et al. ............ | 455/345 |
| 7,239,860 B2 * | 7/2007 | Stoks ....................... | 455/404.1 |
| 2004/0077347 A1 * | 4/2004 | Lauber et al. .............. | 455/428 |
| 2005/0226238 A1 | 10/2005 | Hoskote et al. ............. | 370/389 |

FOREIGN PATENT DOCUMENTS

EP    1168669    1/2002

* cited by examiner

Primary Examiner—Phung T. Nguyen
(74) Attorney, Agent, or Firm—Jacobson Holman PLLC

(57) ABSTRACT

A vehicle tracking system central host comprises a memory cache processor for managing a plurality of memory caches and a storage device linked with the memory cache processor, for receiving messages from the memory caches and writing them to a database. There are n receiver ports each for receiving message packets of an associated protocol from remote vehicle on-board tracker units. There are also n receiver processors, each associated with a port and each receiver processor being for: reading message packets received at the associated port, performing initial processing of the message packets including adding headers to provide processed messages, and writing the processed messages to a log dedicated to the receiver processor. There re also n decoders, each associated with a receiver processor log and being for (a) instantiating a service object for each log, (b) executing each service object to instantiate a message object in which data from a current message is written as attributes of the message object such that instantiation of the message object normalizes the message and the normalized fields include a vehicle identifier field, and (c) executing each service object to repeat step (b) for each successive message in the associated log, and (d) executing the service object to write each message object to one of said memory caches. The ports, the receiver processors, and the decoders operate in parallel.

19 Claims, 10 Drawing Sheets

VEHICLE TRACKING SYSTEM

FIELD OF THE INVENTION

The invention relates to tracking of vehicle position and status events.

PRIOR ART DISCUSSION

It is known to provide an on-board unit which uses technology such as GPS (Global Positioning System) to monitor a vehicle's position and transmit wireless uploads to a central host system. Such a unit may also upload vehicle status events such as engine fault events.

GB2345824 describes such a system, in which transmit times for uploads are scheduled. Also U.S. Pat. Nos. 5,539,810 and 5,544,225 describe transmitting an altered identifier of a cellular transceiver.

In some such systems there may be a large number of vehicles, and the onboard units may be of different types. Also, because of the number of vehicles the volume of data may be excessive at particularly busy periods.

The invention is therefore directed towards providing a tracking system having a central host system for improved management of incoming data traffic without data losses or corruption and/or without database record locking, in which there are multiple wireless protocols used for the uploads.

SUMMARY OF THE INVENTION

According to the invention, there is provided a vehicle tracking system central host comprising:
a memory cache processor for managing a plurality of memory caches;
a storage device linked with the memory cache processor, for receiving messages from the memory caches and writing them to a database;
a plurality of receiver ports each for receiving message packets of an associated protocol from remote vehicle on-board tracker units;
a plurality of receiver processors, each associated with a port and each receiver processor being for:
reading message packets received at the associated port,
performing initial processing of the message packets including adding headers to provide processed messages, and
writing the processed messages to a log dedicated to the receiver processor; and
a plurality of decoders, each associated with a receiver processor log and being for:
(a) instantiating a service object for each log,
(b) executing each service object to instantiate a message object in which data from a current message is written as attributes of the message object such that instantiation of the message object normalizes the message and the normalized fields include a vehicle identifier field,
(c) executing each service object to repeat step (b) for each successive message in the associated log, and
(d) executing the service object to write each message object to one of said memory caches,
wherein the ports, the receiver processors, and the decoders operate in parallel.

In one embodiment, the memory cache processor manages a dedicated memory cache associated with each decoder.

In another embodiment, the host further comprises a data hub for centralised writing of messages from the memory caches to the storage device.

In another embodiment, the host further comprises an analysis engine for reading data from database tables of the storage device, processing it, and writing vehicle tracking analysis data to a reporting database table.

In one embodiment, each receiver processor, at start up, executes fast initialisation routines, returns control to an operating system, and subsequently executes long initialisation routines and enters a message wait stage.

In one embodiment, the receiver processor automatically returns control to the operating system after expiry of a timer period.

In one embodiment, each receiver processor automatically writes received messages to a sequential log file in the log, and writes the processed messages to a separate file in the log.

In one embodiment, each receiver processor further comprises a recovery function for recovery of vehicle messages from the sequential file in event of a failure.

In one embodiment, each receiver processor automatically determines a time stamp and a length value for a received vehicle message, and writes said time stamp and length value to the processed message header.

In one embodiment, the decoder writes the time stamp generated by the receiver processor as an attribute of the message object when instantiating the message object.

In one embodiment, each decoder automatically writes messages to a failed file if a memory cache is not available, and automatically transfers messages from the failed file to a memory cache when it becomes available.

In one embodiment, the decoder instantiates a backlog function object from the service class to write messages to the failed file.

In one embodiment, the backlog function object is named according to the receiver port which received the current messages.

In one embodiment, the host comprises a plurality of unitary receivers executing on a single hardware processor and each comprising a port, an associated receiver processor, an associated log, and an associated decoder.

In one embodiment, the host further comprises a command centre for communicating with the receiver ports to retrieve vehicle data.

In one embodiment, each receiver processor comprises means for performing the following operations in response to instructions from the command centre:
check if a certain vehicle on-board tracker unit is communicating with the associated receiver port,
send a pass-through command to a vehicle on-board tracker unit through the associated receiver port,
send a configuration command to the receiver processor or decoder,
detect when a vehicle on-board tracker unit connects to the associated receiver port and detect when it disconnects from it
receive a pass-through message from a vehicle on-board tracker unit.

In one embodiment, each receiver processor communicates with the command centre using the TCP protocol.

In another aspect, the invention provides a vehicle tracking system comprising:
any central host as defined above; and
a plurality of on-board vehicle tracker units installed in vehicles, said units comprising means for communicating with the receiver ports of the central host.

The invention also provides a computer readable medium comprising software code for performing operations of any vehicle tracking system central host as defined above when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
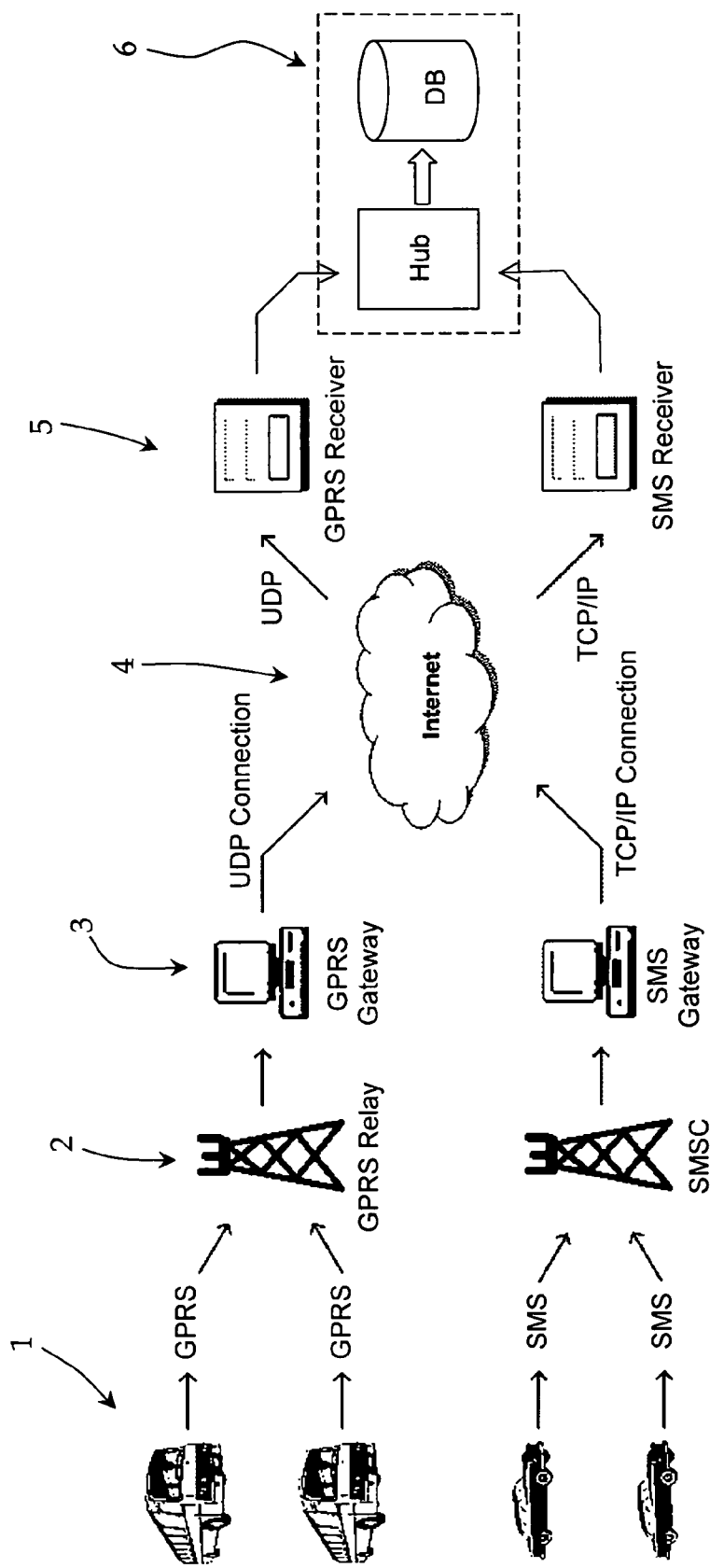
FIG. 1 is a high level view of a vehicle tracking system of the invention.

Referring to FIG. 1 a vehicle tracking system comprises on-board units 1 in vehicles which communicate wirelessly via mobile networks 2 to gateways 3. In this diagram two wireless protocols are indicated, namely GPRS and SMS. However there are typically a variety of additional protocols. The gateways 3 communicate using protocols such as UDP and TCP via the Internet 4 with a host system having receivers 5 which are operating system services, and a data storage system 6. The incoming data is written from the receivers 5 to the data storage system 6.

Figure 2:
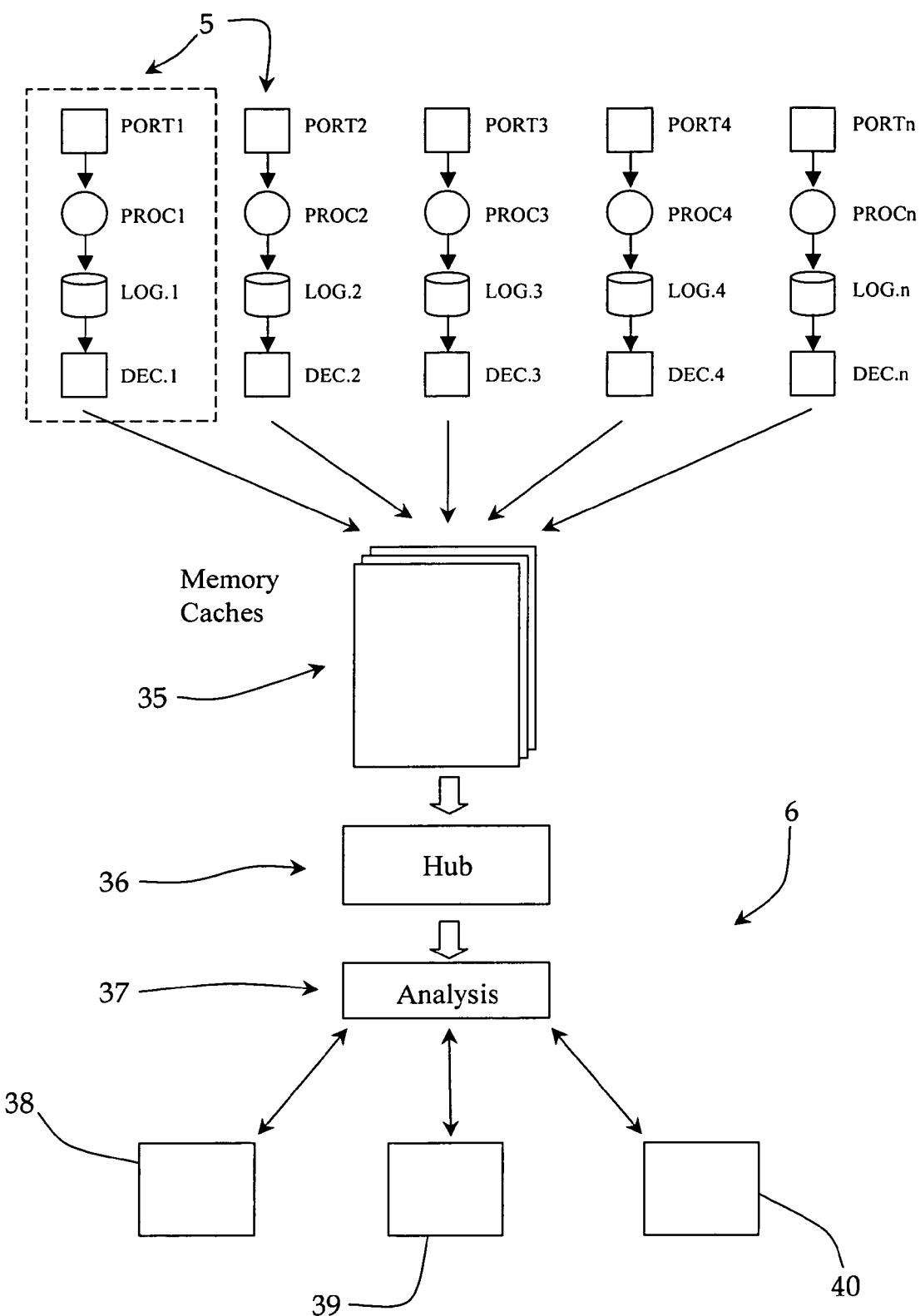
FIG. 2 is a more detailed diagram, showing a central host of the system in more detail.

Referring to FIG. 2, there are n receivers 5, each comprising a port PORTi, a process PROCi, a data log LOGi, and a decoder DECi. The decoders DECi decode data from all logs and write the decoded data to memory caches 35, which are transferred to a hub 36 of the data storage system 6. The hub 36 routes the data to an analysis engine 37, which in turn processes the data and maintains a number of database tables 38, 39, and 40.

Figure 3:
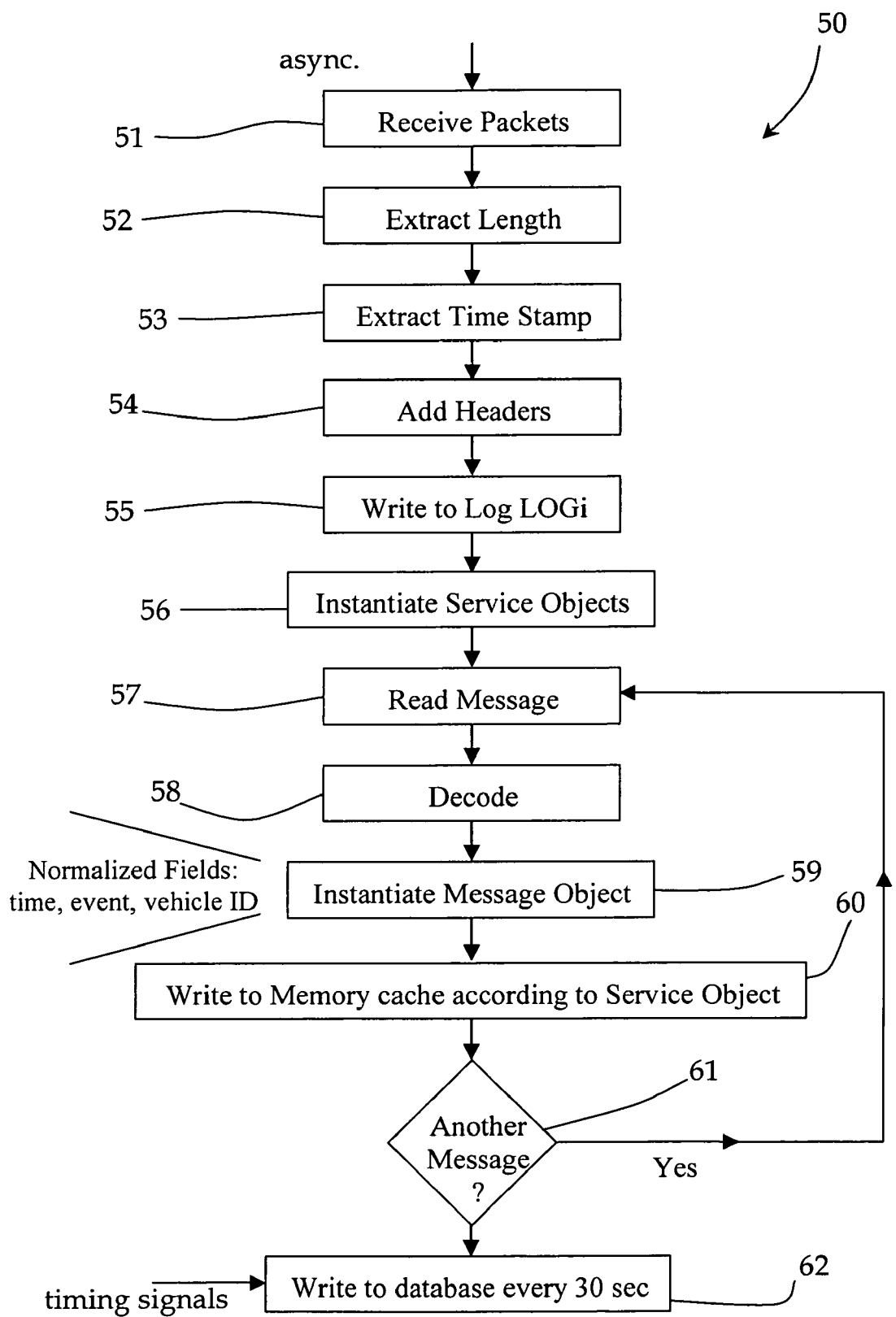
FIG. 3 is a flow diagram of the steps involved in storing received data in one of multiple parallel threads.

In more detail, FIG. 3 illustrates a method 50 which is carried out for each thread from a receiver port PORTi to the hub 36. Of the steps in the method 50, steps 51-55 are performed by the relevant receiver process PROCi to result in raw data being stored in a log LOGi.

In step 51 packets of "raw" data from a vehicle are received asynchronously at the port PORTi. The packet message format depends on the origin of the data at the vehicle on-board unit (or "terminal"). For example, packets which originate from on-board unit GPRS data will have a different format from that which originate from on-board unit SMS data.

Each process PROCi actually saves two log files within its dedicated log LOGi. The first is a sequential file to which data is directly written. A recovery mechanism in the receiver 5 allows recovery from this file in the event of a failure. Upon writing to the sequential file, the process PROCi in step 52 extracts message length and in step 53 determines a time stamp. These are added as headers in step 54, and the augmented message is stored in step 55 in the log file LOGi.

Steps 51-55 are implemented by an independent process PROCi for each thread, all in parallel.

At the start of a session, each decoder DECi instantiates a service object for each thread, i.e. for each log LOGi, in step 56. Each service object reads a next message in its associated log LOGi in step 57 and for this message it performs decoding 58 and instantiates 59 a dedicated message object. The message object instantiation involves writing data from the current message as attributes of the message object. Thus, an inherent part of instantiation of each message object is normalization of the data to achieve a particular data format. The data is normalized into fields including time, event, and vehicle identifier. As the service class is instantiated frequently, there is ample opportunity to modify the message class so that the class has different attributes and hence there- is a modified normalization process.

In step 60 the service object writes the message object to a memory cache 35. The structure of all of the data in each memory cache 35 is consistent because the message objects are written, and all message objects are instantiated by the same service object.

As each memory cache 35 becomes full it is written to the hub 36 in step 60. The cache size is limited by the hardware resources, and there is no specific restriction on size.

As indicated by step 61, steps 57 to 60 are repeated for each message of the log LOGi. When all messages of a log have been processed, the service object is terminated and a timer is activated in step 62 to trigger a fresh service object instantiation step 56. The timing of instantiation of a fresh service object can be different in other embodiments, such as at start-up of the receiver.

It will be appreciated that, because the method 50 is performed by all of the receivers 5, multiple threads are simultaneously processed and so a large volume of data can be handled at any time. This is the case even though the received messages use different protocols, according to the variety of different on-board systems in the vehicles.

The analysis engine 37 processes the data in the tables to add value. This may include, for example, calculating latitude and longitude co-ordinates. It carries out further processing such as determining street address according to a digital map. Any of the analysis functions may automatically check for alerts.

Service Start-up 70

Figure 4:
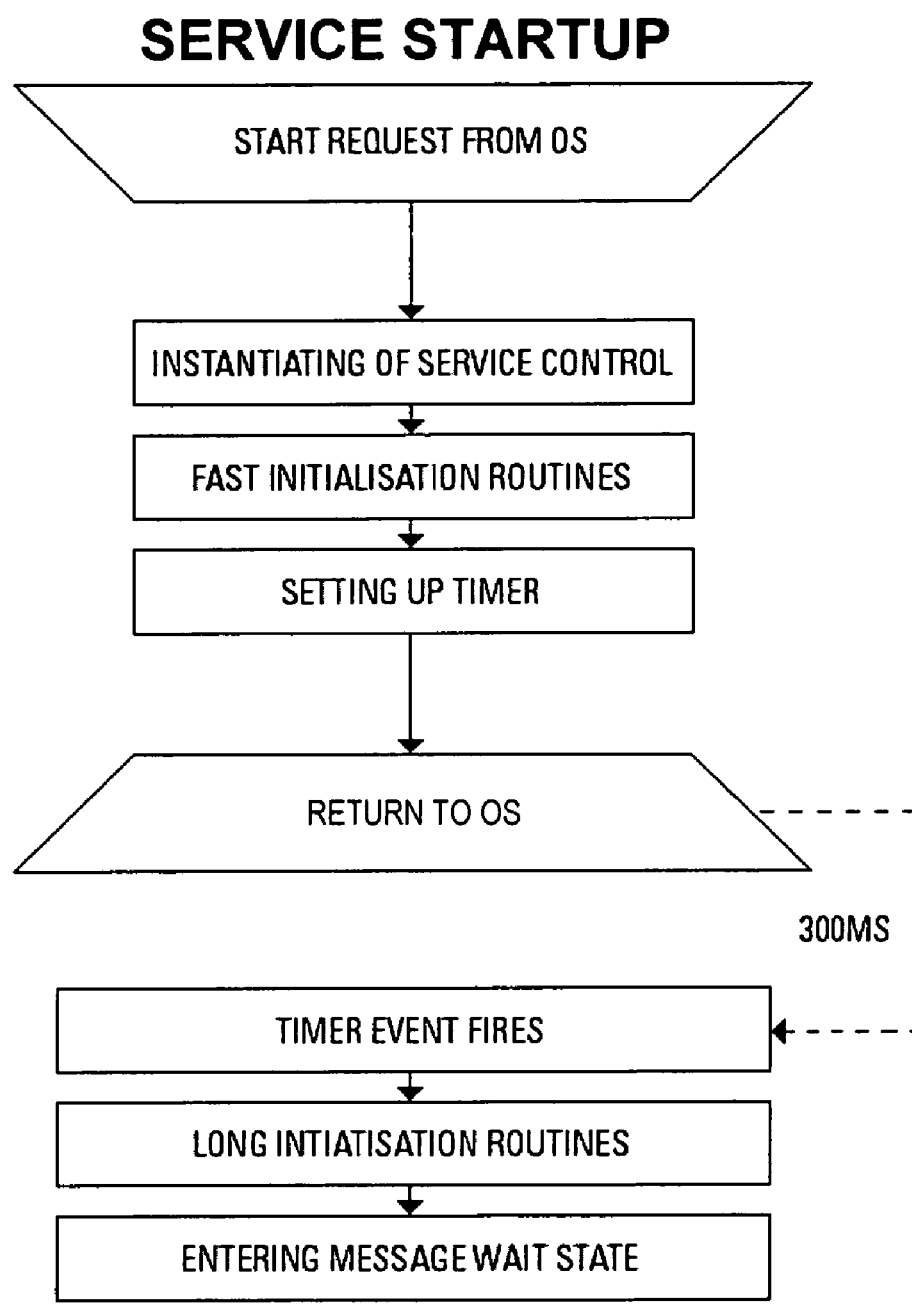
FIGS. 4 to 8 are more detailed flow diagrams illustrating operation of the central host.

Referring to FIG. 4, in the receivers 5 there are routines that may take a long time to execute and so may potentially lead to expiry of a system wait timer or cause a processor bottleneck. In order to overcome this, the receiver 5 executes on start-up only the routines that are fast. Then, the receiver 5 creates a timer for 100-300 milliseconds (which is quite long in processor terms) and returns execution to the OS to ensure the program is started. When the timer fires up the time-consuming operations are performed and the receiver enters a state waiting for messages.

Backlog Mechanism 80

Figure 5:
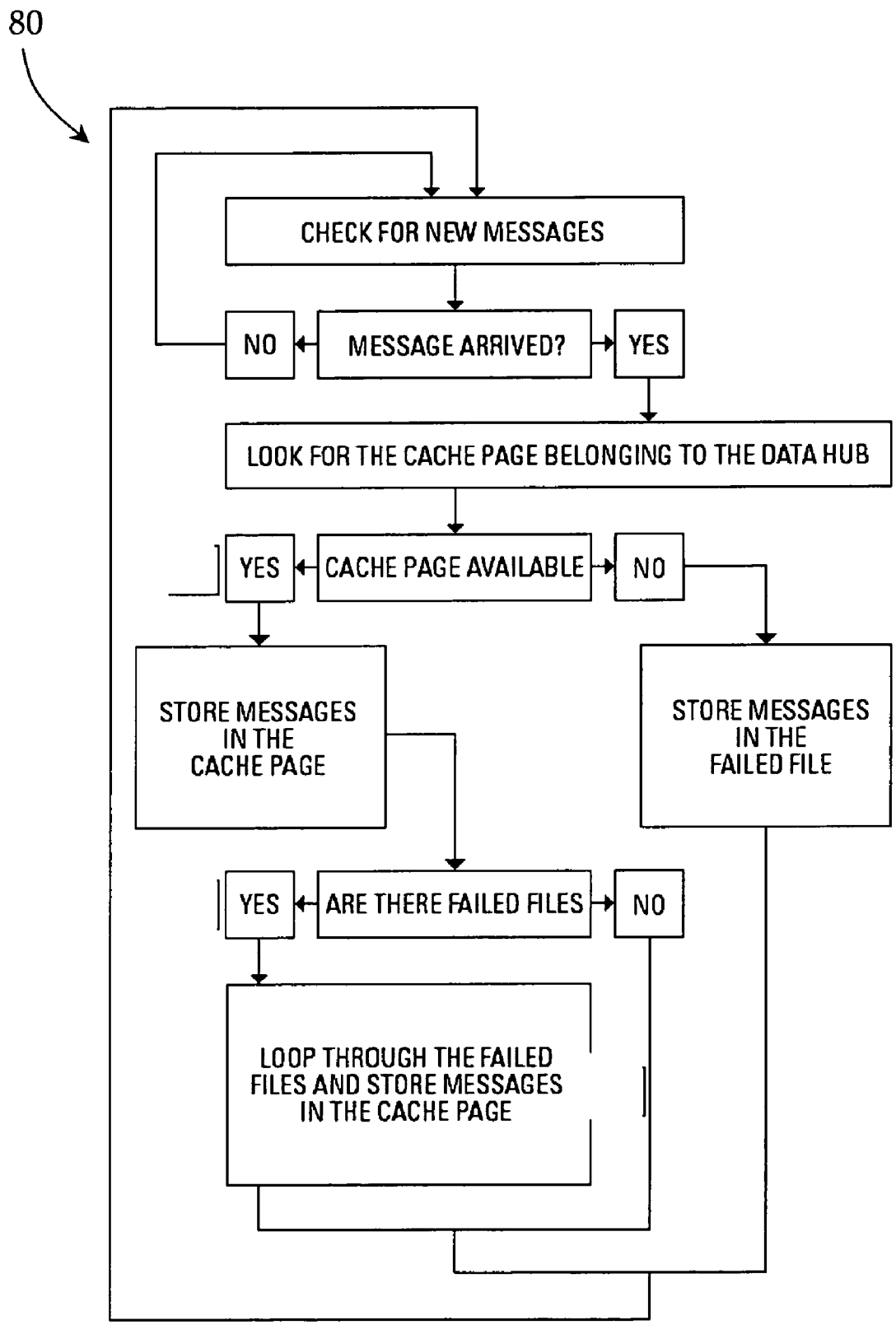

Referring to FIG. 5 a backlog mechanism 80 is activated when one of the following two events happens:

the data hub 36 is off, or the database 38, 39, 40 is off, down, locked, or extremely slow while performing large operations on data.

The backlog mechanism is implemented on the level of the service class dynamic linked library (DLL). The receivers 5 operate independently of the status of the database 38-40 and the data hub 36 because the backlog mechanism is encapsulated in the service object they instantiate from the service class.

The decoder DECi checks for new messages in the log file LOGi and if it finds any it searches for a cache page created by the data hub 36 to place the message there. A cache page is created only if the data hub 36 is ready to receive a message for further insertion into the database. If the data hub 36 is experiencing problems with the database 38-40 it does not create a cache page as this would be interpreted as indicating that it is awaiting caches. The backlog routines then activate in the service class, and f the data hub 36 shuts down the backlog routines start working. The service class creates a "failed" file in a designated location named according to the receiver 5 and stores the message in this file. All of the following messages go through the same check. Once a new message is received the service object looks for the cache page. If it doesn't find it, it appends the message to the "failed" file. But once the cache page is found the message is saved there.

The service class then processes all of the messages stored in the "failed" file and writes them to the cache page.

Message Normalisation 90

Figure 6:
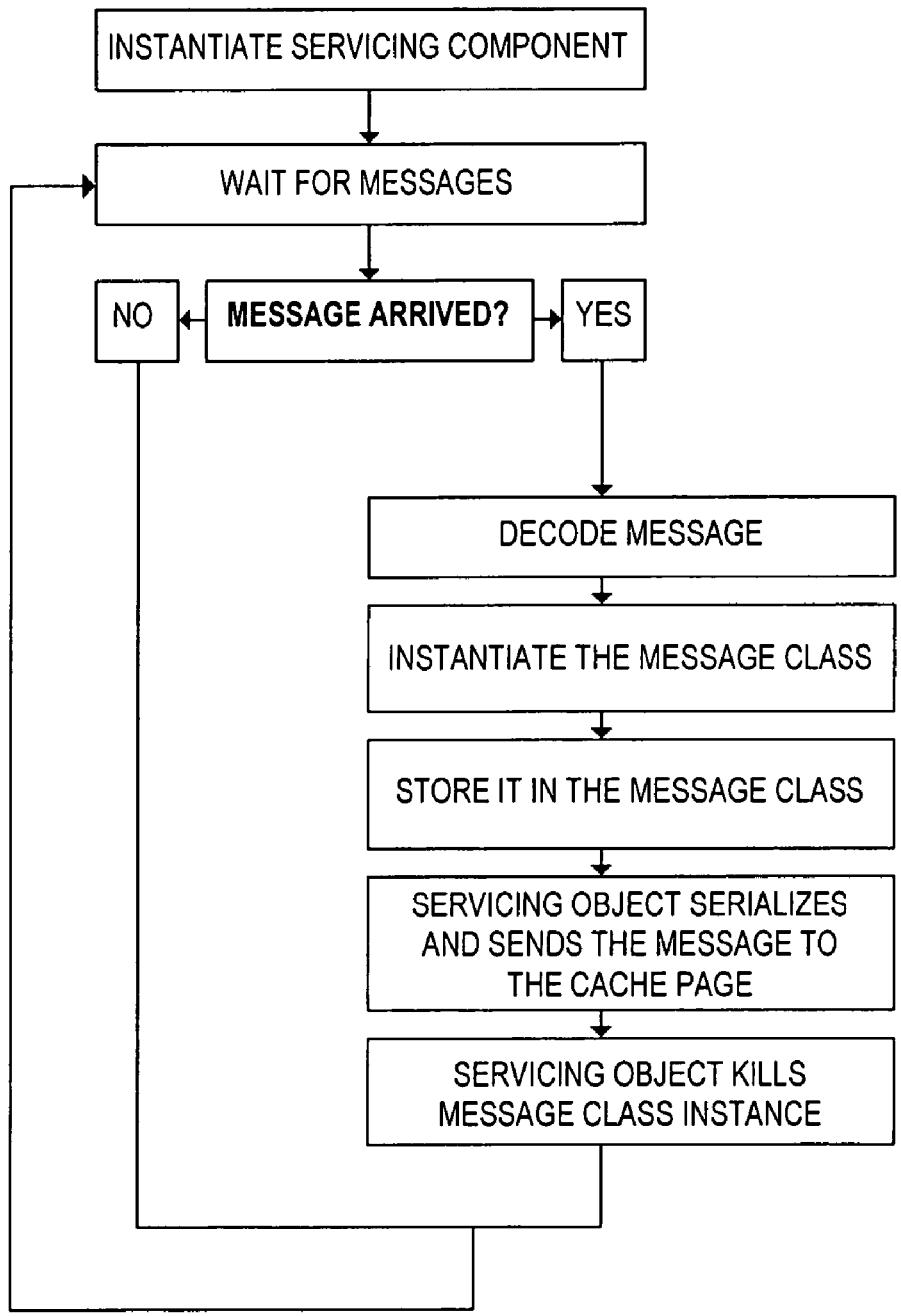
Figure 7:
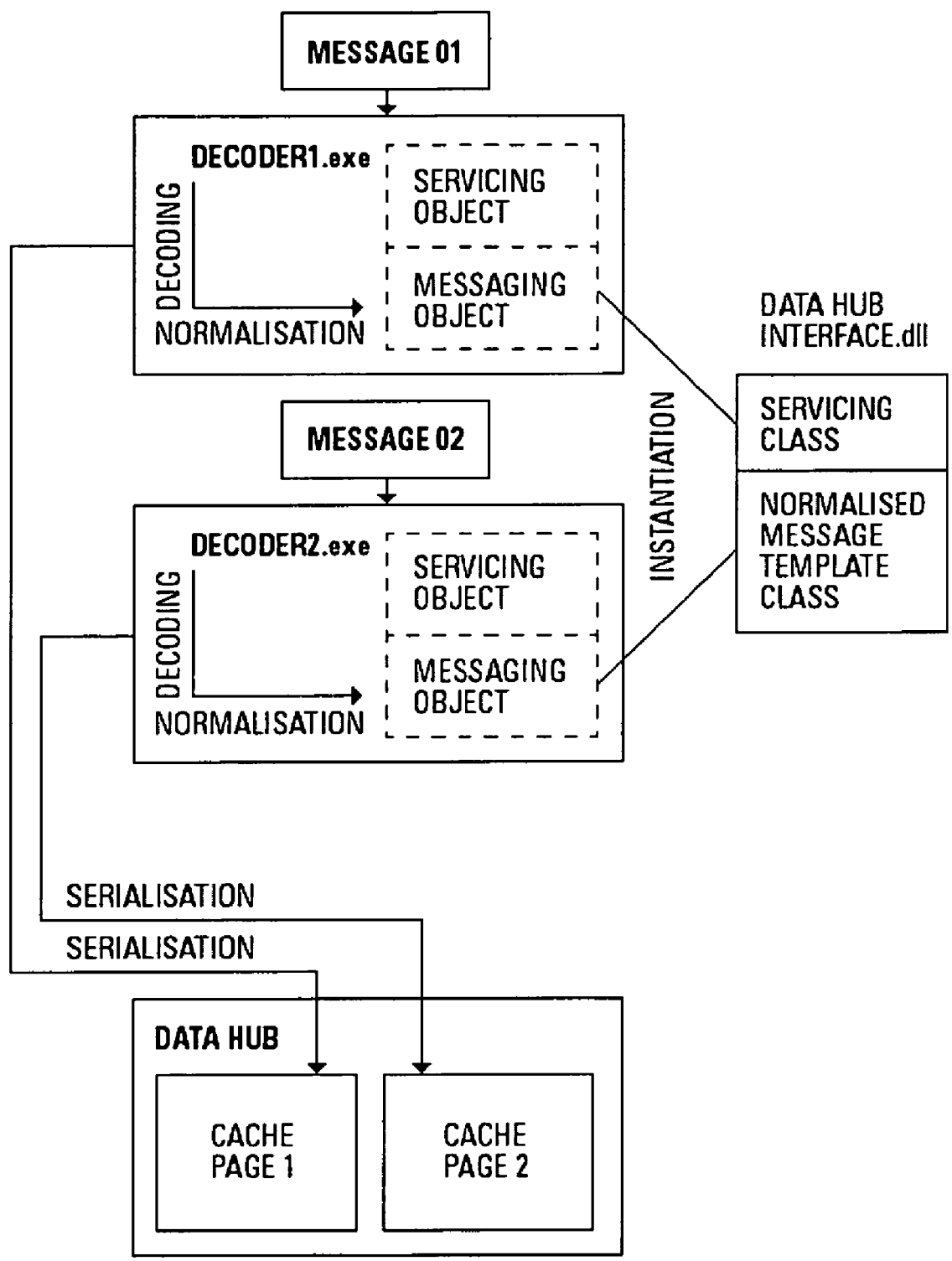

The operations performed by the processors PROCi and the decoders DECi for message normalization are set out in FIGS. 6 and 7. The functions to transfer messages to the data hub 36 are in a reusable library. This library also contains a class which includes a template of a normalised message. All messages in all receivers 5 are brought to this standard normalised form.

When a receiver 5 starts it loads the library and instantiates the service object from the service class. The life-cycle of the service object (or "servicing component") is the same as of the program. When a new message arrives it is decoded. The service object is instructed to create a message class. The life-time of the message class is completely managed by the service object, in turn depending on the attributes it inherits from the service class. All of the normalised fields of the message class are filled in from the decoded values. The service object is instructed to store the message. The service object terminates the message, releasing used memory. The cycle repeats with a new message arrival.

In passing the messages from the decoder DECi to the hub 36 there should not be locking when two messages arrive simultaneously. Though the data hub 36 has no access to the receiver's memory, (because it is a different program running on the server), it should not be slow like TCP/IP, as there will be many messages coming with the very fast rate.

Figure 8:
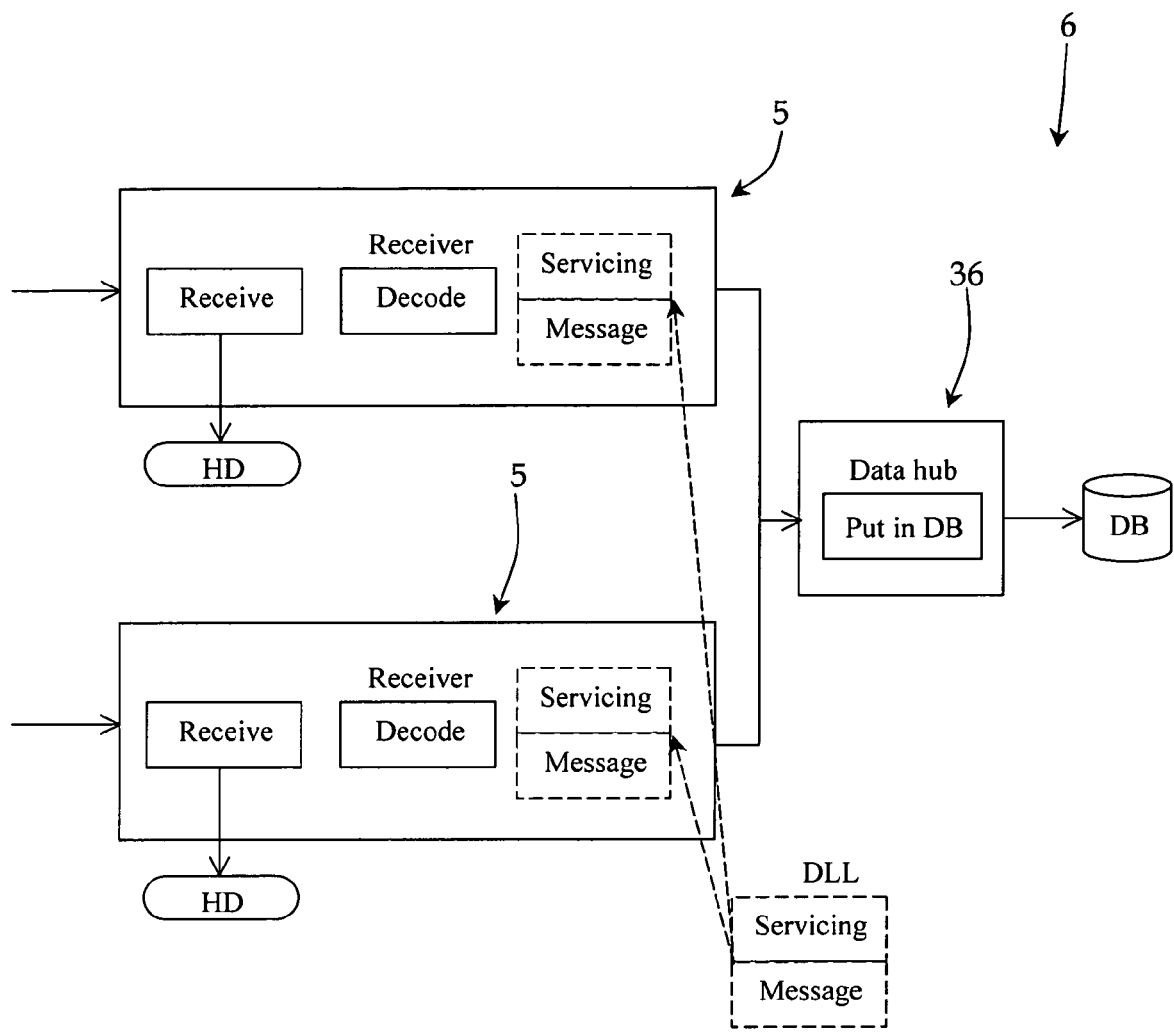

The service class library is reused by any receiver 5 that would want to send messages to the data hub 36. The message class standardises the form of the message to be passed between the receivers 5 and data hub 36. This is illustrated in FIG. 8. Each receiver 5 instantiates objects from the library DLL and uses it to send the messages to data hub 36.

Figure 9:
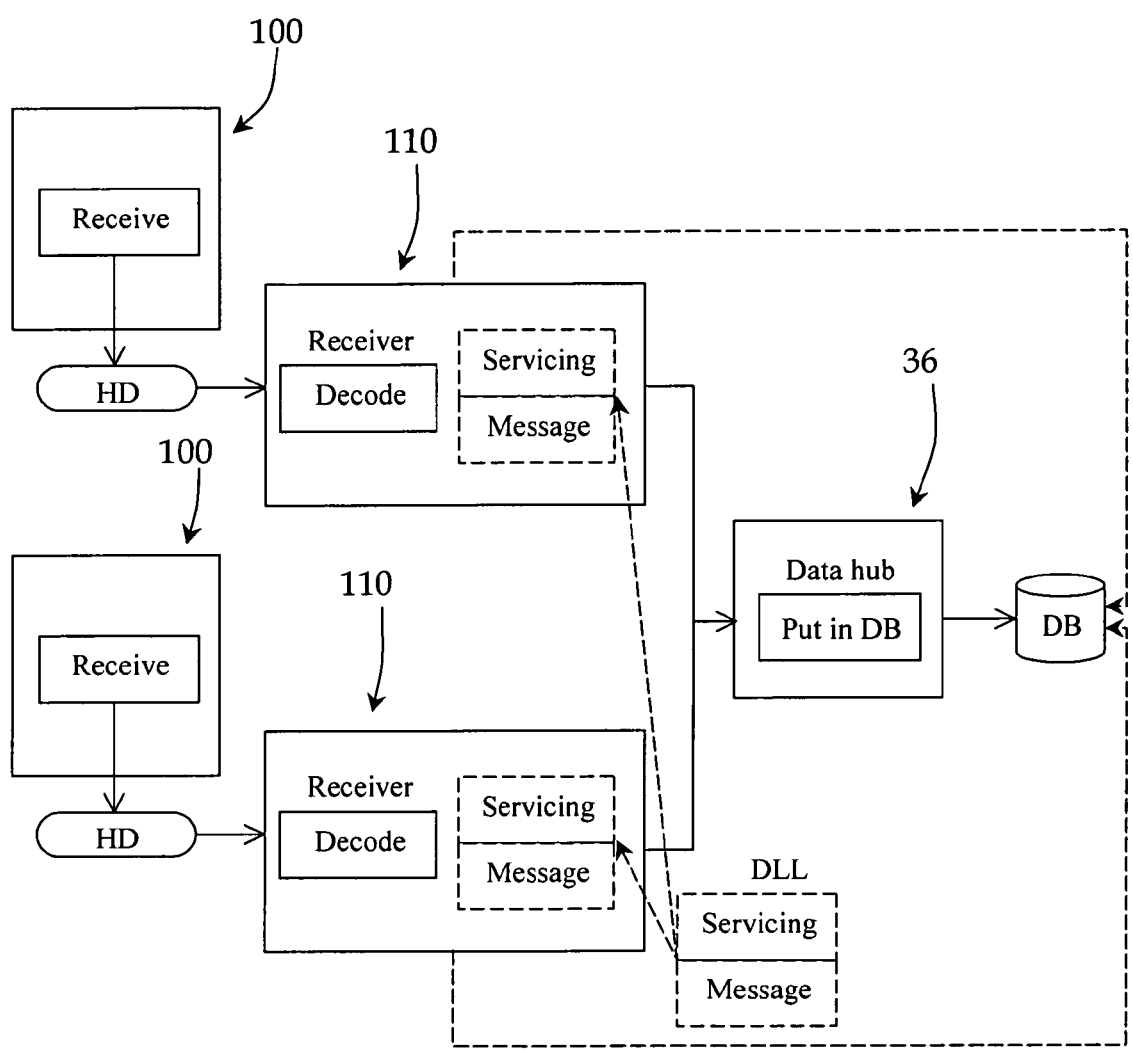
FIG. 9 is a diagram illustrating an alternative central host architecture.

Referring to FIG. 9, an arrangement is shown in which a receiver 100 is separate from a decoder 110. This is advantageous where the decoding operations are quite complicated. Because the receivers 100 are very simple, there is less chance of a receiver bottleneck arising for incoming streams of messages.

Receiver Control 120

Figure 10:
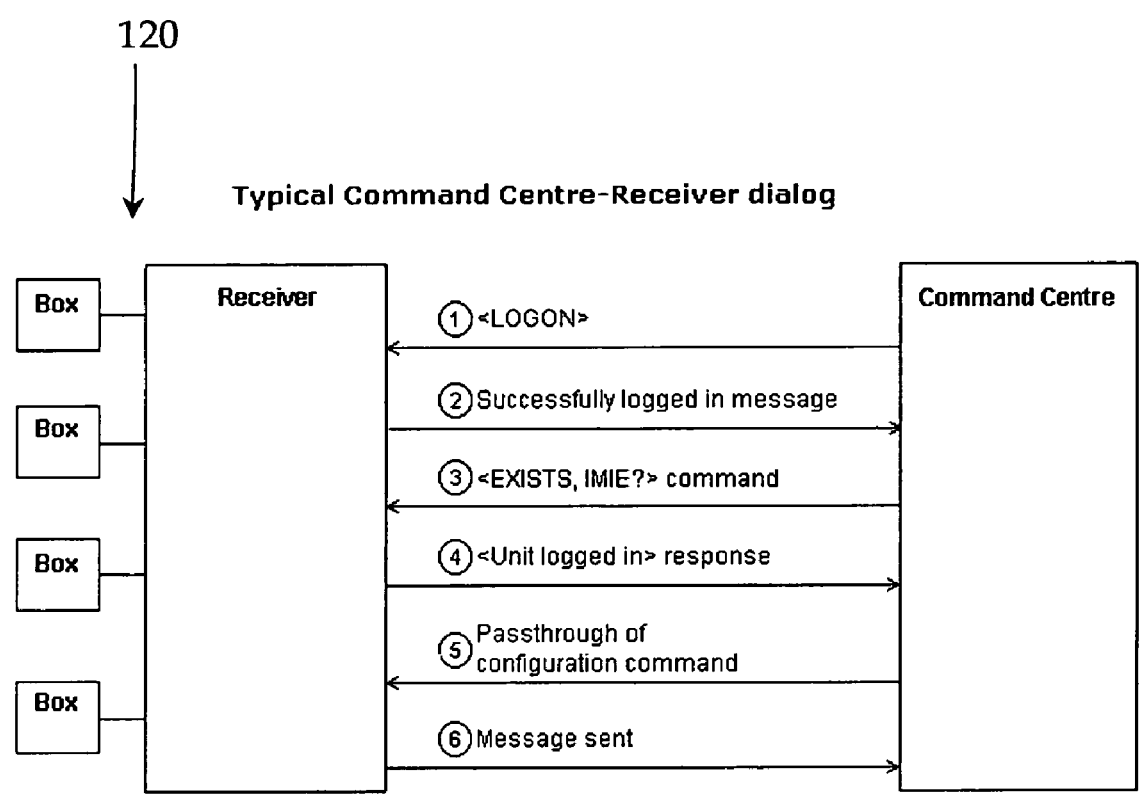
FIG. 10 is a block diagram showing command centre signals at a receiver.

Referring to FIG. 10, Command Centre Protocol is a protocol of communication with receivers. This protocol describes how to send commands to receivers and what to expect as a response from them in order to:

a) Check if a certain vehicle is communicating with this receiver
b) Send a pass-through command to the vehicle through the receiver
c) Send a configuration command to the receiver
d) Detect when the vehicle connects to the receiver and detect when it disconnects from it.
e) Receive a pass-through message from any vehicle terminal unit.

The receivers 5 and 100 provide only so-called "pass-trough" services for any program that requires to send a message to the vehicle. It means that the logic is minimal on the receiver—it is just programmed to recognise commands of an external program and to route the messages from and to the vehicle and external program.

Such an external program is called a "Command Centre". The "Command Centre" must employ all the logic necessary to decide what and when vehicles get messages from it. And what to do upon such events as: "vehicle logged in", "vehicle logged out", "vehicle sent user message". The command centre connects to the receiver through a TCP connection—on the same port vehicles connect. Or, if the receiver is a UDP one, a specific TCP port is provided. The receiver allows connection from only one command centre at a time. If the second command centre logs in when there is one already connected—the old one is automatically disconnected, on condition that the new one logs in properly.

Referring again to FIG. 10, the first thing when the command centre connects is to send a LOGON command. If a correct LOGON command is received by the receiver (see FIG. 10 for syntax) then the receiver recognises the connection as a command centre connection and will be execute commands from it.

All packets that the command centre sends to the receiver should start with a service character with ASCII code 27. All the responses from the receiver will contain the same Escape code as a first character of all packets.

Below, characters 27 are represented as "←".

All parameters shown in black are the actual values, whereas parameters in lower case are the words as they should appear in the message Common syntax for the commands is
←IMEI<COMMAND>

Common syntax for the responds is
←IMEI<ERR_CODE,RESPONSE_TEXT>

When an IMEI number is not applicable—it should be equal to 0.

The following are possible error codes:

| Error code | RESPONSE text |
| --- | --- |
| 1 | No such IMEI connected |
| 2 | You must login first |
| 3 | Another Command Centre is connected |
| 4 | Already logged in |
| 5 | Message sent |
| 6 | Successfully logged in |
| 7 | Successfully re-logged in |
| 8 | Unit logged in |
| 9 | Unknown command |
| 10 | Connection aborted by unit |
| 11 | Opening angle bracket expected |

Command Centre Login
Command: ←0<LOGIN>
Description: Command logs in Command Centre. Should be issued as the first command after the connection.
Responses: If everything OK—you would get ←0<6, Successfully logged in>.
  If another Command Centre was connected you would get: ←0<7, Successfully re-logged in>

Checking if Vehicle Is Connected to the Receiver
Command: ←IMEI<EXISTS>
Description: Command checks if the unit with certain IMEI is currently connected to the receiver.
Responses: If the unit is connected—you would get ←0<8, Unit logged in>.
  Otherwise: ←0<1, No such IMEI connected>

Sending Command or Pass-through Command to the Receiver
Command:
  ←IMEI<CONFIG_LINE_OR_PASS_TROUGH_MESSAGE>
Description: Whatever is after the IMEI number (starting with opening angle bracket) is sent to the unit. (Including angle brackets)
Responses: If the message was forwarded successfully you would get ←0<5, Message sent>.
  If vehicle with specified in command IMEI not connected: ←0<1, No such IMEI connected>
  You can also get: "←0<9, Unknown command>"; "←0<11, Opening angle bracket expected>" or "←0<2, You must login first>" responses.

Getting Response From the Box
  Whatever is received from the unit and not understood by receiver (i.e. is not a location message)—is get sent to Command Centre in the standard form. ←IMEI<MESSAGE>
  Where IMEI is the IMEI number which vehicle this message was received from.

Tracking the Unit's Connection and Disconnection
  When unit is connected the following messages is sent to the Command Centre: ←IMEI<LOGON>
  Where IMEI is the IMEI number of vehicle that logged in to the receiver.
  When unit is disconnected the following messages is sent to the Command Centre: ←IMEI<10, Connection aborted by unit>,
    where IMEI again is the IMEI number of vehicle that disconnected from the receiver.

It will be appreciated that the invention provides a very durable mechanism for handling large numbers of asynchronous messages from vehicles, even though the messages may be in a variety of different protocols. There is also excellent robustness within the system, as it efficiently handles situations in which there are software or hardware failures in database mechanisms. The system also provides for very efficient data processing for analysis because of the extent of normalisation achieved.

The invention is not limited to the embodiments described but may be varied in construction and detail.

The invention claimed is:
1. A vehicle tracking system central host comprising:
  a memory cache processor for managing a plurality of memory caches;
  a storage device linked with the memory cache processor, for receiving messages from the memory caches and writing them to a database;
  a plurality of receiver ports each for receiving message packets of an associated protocol from remote vehicle on-board tracker units;
  a plurality of receiver processors, each associated with a port and each receiver processor being for:
    reading message packets received at the associated port,
    performing initial processing of the message packets including adding headers to provide processed messages, and
    writing the processed messages to a log dedicated to the receiver processor; and
  a plurality of decoders, each associated with a receiver processor log and being for:
    (a) instantiating a service object for each log,
    (b) executing each service object to instantiate a message object in which data from a current message is written as attributes of the message object such that instantiation of the message object normalizes the message and the normalized fields include a vehicle identifier field,
    (c) executing each service object to repeat step (b) for each successive message in the associated log, and
    (d) executing the service object to write each message object to one of said memory caches,
  wherein the ports, the receiver processors, and the decoders operate in parallel.

2. The vehicle tracking system central host as claimed in claim 1, wherein the memory cache processor manages a dedicated memory cache associated with each decoder.

3. The vehicle tracking system central host as claimed in claim 1, further comprising a data hub for centralised writing of messages from the memory caches to the storage device.

4. The vehicle tracking system central host as claimed in claim 1, further comprising an analysis engine for reading data from database tables of the storage device, processing it, and writing vehicle tracking analysis data to a reporting database table.

5. The vehicle tracking system central host as claimed in claim 1, wherein each receiver processor, at start up, executes fast initialisation routines, returns control to an operating system, and subsequently executes long initialisation routines and enters a message wait stage.

6. The vehicle tracking system central host as claimed in claim 5, wherein the receiver processor automatically returns control to the operating system after expiry of a timer period.

7. The vehicle tracking system central host as claimed in claim 1, wherein each receiver processor automatically writes received messages to a sequential log file in the log, and writes the processed messages to a separate file in the log.

8. The vehicle tracking system central host as claimed in claim 7, wherein each receiver processor further comprises a recovery function for recovery of vehicle messages from the sequential file in event of a failure.

9. The vehicle tracking system central host as claimed in claim 1, wherein each receiver processor automatically determines a time stamp and a length value for a received vehicle message, and writes said time stamp and length value to the processed message header.

10. The vehicle tracking system central host as claimed in claim 9, wherein the decoder writes the time stamp generated by the receiver processor as an attribute of the message object when instantiating the message object.

11. The vehicle tracking system central host as claimed in claim 1, wherein each decoder automatically writes messages to a failed file if a memory cache is not available, and automatically transfers messages from the failed file to a memory cache when it becomes available.

12. The vehicle tracking system central host as claimed in claim 1, wherein each decoder automatically writes messages to a failed file if a memory cache is not available, and automatically transfers messages from the failed file to a memory cache when it becomes available; and wherein the decoder instantiates a backlog function object from the service class to write messages to the failed file.

13. The vehicle tracking system central host as claimed in claim 12, wherein the backlog function object is named according to the receiver port which received the current messages.

14. The vehicle tracking system central host as claimed in claim 1, wherein the host comprises a plurality of unitary receivers executing on a single hardware processor and each comprising a port, an associated receiver processor, an associated log, and an associated decoder.

15. The vehicle tracking system central host as claimed in claim 1, further comprising a command centre for communicating with the receiver ports to retrieve vehicle data.

16. The vehicle tracking system central host as claimed in claim 1, further comprising a command centre for communicating with the receiver ports to retrieve vehicle data; and wherein each receiver processor comprises means for performing the following operations in response to instructions from the command centre:

check if a certain vehicle on-board tracker unit is communicating with the associated receiver port, send a pass-through command to a vehicle on-board tracker unit through the associated receiver port, send a configuration command to the receiver processor or decoder, detect when a vehicle on-board tracker unit connects to the associated receiver port and detect when it disconnects from it receive a pass-through message from a vehicle on-board tracker unit.

17. The vehicle tracking system central host as claimed in claim 16, wherein receiver processor communicates with the command centre using the TCP protocol.

18. A vehicle tracking system comprising:

the central host as claimed in claim 1; and a plurality of on-board vehicle tracker units installed in vehicles, said units comprising means for communicating with the receiver ports of the central host.

19. A computer readable medium comprising software code for performing operations of the vehicle tracking system central host of claim 1 when executing on a digital processor.

* * * * *